(12) United States Patent
Mattingly et al.

(10) Patent No.: US 10,445,686 B2
(45) Date of Patent: *Oct. 15, 2019

(54) SYSTEMS AND METHODS FOR ENABLING DELIVERY OF COMMERCIAL PRODUCTS TO CUSTOMERS

(71) Applicant: Walmart Apollo, LLC, Bentonville, AR (US)

(72) Inventors: Todd D. Mattingly, Bentonville, AR (US); Bruce W. Wilkinson, Rogers, AR (US); Donald R. High, Noel, MO (US); Brian G. McHale, Chadderton Oldham (GB)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,339

(22) Filed: Jan. 2, 2019

(65) Prior Publication Data
US 2019/0138987 A1 May 9, 2019

Related U.S. Application Data

(63) Continuation of application No. 15/813,859, filed on Nov. 15, 2017, now Pat. No. 10,198,708.
(Continued)

(51) Int. Cl.
*G06Q 10/08* (2012.01)
*G01C 21/34* (2006.01)
(Continued)

(52) U.S. Cl.
CPC ... *G06Q 10/08355* (2013.01); *G01C 21/3453* (2013.01); *G05D 1/0276* (2013.01);
(Continued)

(58) Field of Classification Search
CPC ........... G06Q 10/08355; G06Q 50/265; G06Q 10/083; G06Q 10/08; G06Q 10/087;
(Continued)

(56) References Cited

U.S. PATENT DOCUMENTS 8,010,230 B2   8/2011  Zini
9,412,280 B1 * 8/2016  Zwillinger ........... G08G 5/0069
(Continued)

OTHER PUBLICATIONS

Aethon; "How the TUG Autonomous Mobile Robot Works"; http://www.aethon.com/tug/how-it-works/; available at least as early as May 31, 2016; pp. 1-4.
(Continued)

*Primary Examiner* — Brian E Miller
(74) *Attorney, Agent, or Firm* — Fitch, Even, Tabin & Flannery LLP

(57) ABSTRACT

In some embodiments, systems and methods are provided herein useful to enable delivery of commercial products to customers. In some embodiments, the system comprises an autonomous ground vehicle on a delivery route to deliver commercial products to a person of interest. The AGV comprises control circuits communicatively coupled to sensors. The control circuits, using sensor data, determines whether a person positioned within a threshold distance relative to the AGV is the PoI; allow the PoI to designate an intention of a second person positioned within the threshold distance as being friendly or adverse relative to the PoI; determine the intention of the second person; receive a command from the PoI overriding the determination that the second person's intention is adverse to the PoI; and allow the PoI to take possession of the commercial products when the designated intention is friendly relative to the PoI and the command is received.

20 Claims, 4 Drawing Sheets

Related U.S. Application Data

(60) Provisional application No. 62/423,098, filed on Nov. 16, 2016.

(51) Int. Cl.
  | | |
  |---|---|
  | *G05D 1/02* | (2006.01) |
  | *G06Q 50/26* | (2012.01) |
  | *G08B 3/00* | (2006.01) |
  | *G08B 21/02* | (2006.01) |
  | *G08B 21/22* | (2006.01) |

(52) U.S. Cl.
  CPC .............. *G06Q 50/265* (2013.01); *G08B 3/00* (2013.01); *G08B 21/0297* (2013.01); *G08B 21/22* (2013.01)

(58) Field of Classification Search
  CPC .......... G06Q 10/0833; G06Q 30/0601; G05D 1/0276; G05D 1/0272; G05D 1/027; G05D 1/0278; G05D 2201/0216; G05D 1/0255; G05D 1/0274; G05D 1/0246; G05D 1/0088; G08B 3/00; G08B 21/0297; G08B 15/02; G01C 21/3453; G06N 3/008; B62D 57/032; G08G 1/042; G08G 1/017; G08G 1/02; G08G 1/04; G07B 15/063; H04R 1/028
  See application file for complete search history.

(56) References Cited

U.S. PATENT DOCUMENTS

| | | | |
|---|---|---|---|
| 9,523,986 B1* | 12/2016 | Abebe | G08G 5/00 |
| 9,550,577 B1 | 1/2017 | Beckman | |
| 9,573,684 B2 | 2/2017 | Kimchi | |
| 2014/0067167 A1 | 3/2014 | Levien | |
| 2014/0279596 A1 | 9/2014 | Waris | |
| 2014/0330456 A1* | 11/2014 | Lopez Morales | G06Q 10/08355 701/3 |
| 2015/0006005 A1* | 1/2015 | Yu | G06Q 10/08 701/22 |
| 2015/0120596 A1 | 4/2015 | Fadell | |
| 2015/0202770 A1* | 7/2015 | Patron | G05D 1/024 700/245 |
| 2015/0242806 A1 | 8/2015 | Cousins | |
| 2015/0277440 A1 | 10/2015 | Kimchi | |
| 2015/0302571 A1 | 10/2015 | Lambert | |
| 2016/0070260 A1 | 3/2016 | Levien | |
| 2016/0196755 A1 | 7/2016 | Navot | |
| 2016/0239803 A1* | 8/2016 | Borley | G06Q 10/0833 |
| 2016/0257401 A1 | 9/2016 | Buchmueller | |
| 2017/0110017 A1 | 4/2017 | Kimchi | |
| 2017/0132562 A1* | 5/2017 | High | B64C 39/024 |
| 2017/0154371 A1* | 6/2017 | Harvey | G06Q 30/0617 |
| 2017/0300855 A1* | 10/2017 | Lund | B64C 39/024 |
| 2017/0308098 A1* | 10/2017 | Yu | G06Q 10/08 |
| 2018/0005169 A1* | 1/2018 | High | G06Q 10/083 |
| 2018/0024554 A1* | 1/2018 | Brady | G05D 1/0088 |
| 2018/0059675 A1* | 3/2018 | Bevot | G05D 1/0088 |
| 2018/0101811 A1* | 4/2018 | Mattingly | G05D 1/0088 |
| 2018/0102128 A1* | 4/2018 | Mattingly | G05D 1/0088 |
| 2018/0107971 A1* | 4/2018 | Vukin | G06Q 10/087 |
| 2018/0108192 A1* | 4/2018 | Ho | H04L 12/282 |
| 2018/0136657 A1* | 5/2018 | Mattingly | F41H 9/00 |
| 2018/0158018 A1* | 6/2018 | Luckay | G06Q 10/0832 |
| 2018/0164818 A1* | 6/2018 | Wilkinson | G06K 9/00 |

OTHER PUBLICATIONS

Dezeen; "Grocery-delivering robots launched by Skype co-founders"; http://www.dezeen.com/2015/11/10/grocery-delivering-robots-launched-skype-co-founders-london-trial/; available at least as early as May 31, 2016; pp. 1-29.

LBB Online; "Domino's Rolls Out World's First Driverless Pizza Delivery Vehicles"; https://lbbonline.com/news/dominos-rolls-out-worlds-first-driverless-pizza-delivery-vehicles/; Mar. 31, 2015; pp. 1-8.

PCT; App. No. PCT/US2017/061662; International Search Report and Written Opinion dated Feb. 9, 2018.

Reisner, Bob; "Robot Food Delivery—[4] Customer Delivery Experience"; https://sdvimpacts.quora.com/Robot-Food-Delivery-4-Customer-Delivery-Experience; Sep. 27, 2015; pp. 1-2.

USPTO; U.S. Appl. No. 15/813,859; Office Action dated May 15, 2018.

USPTO; U.S. Appl. No. 16/011,932; Notice of Allowance dated Nov. 27, 2018.

* cited by examiner

SYSTEMS AND METHODS FOR ENABLING DELIVERY OF COMMERCIAL PRODUCTS TO CUSTOMERS

RELATED APPLICATION(S)

This application is a continuation of U.S. application Ser. No. 15/813,859, filed Nov. 15, 2017, which claims the benefit of U.S. Provisional Application No. 62/423,098, filed Nov. 16, 2016, all of which are incorporated by reference in their entirety herein.

TECHNICAL FIELD

This invention relates generally to enabling delivery of commercial products to customers.

BACKGROUND

In the transportation and logistics industry, "last mile" delivery refers to the final leg of the supply chain, in which consumer goods are delivered to their final destination. There are many challenges to making delivery to the final destination. Some examples include theft of packages if they are left on the doorstep of the recipient's home, having to schedule a delivery time with the recipient, having to skip the delivery and return another day, leaving the package with an unreliable concierge or roommate, requiring the presence of the recipient at an inconvenient time, or requiring the recipient to travel to a special locker or other designated location to pick up their package.

BRIEF DESCRIPTION OF THE DRAWINGS

Disclosed herein are embodiments of systems and methods pertaining to enabling delivery of commercial products to customers via an autonomous ground vehicle ("AGV"). This description includes drawings, wherein.

Figure 1:
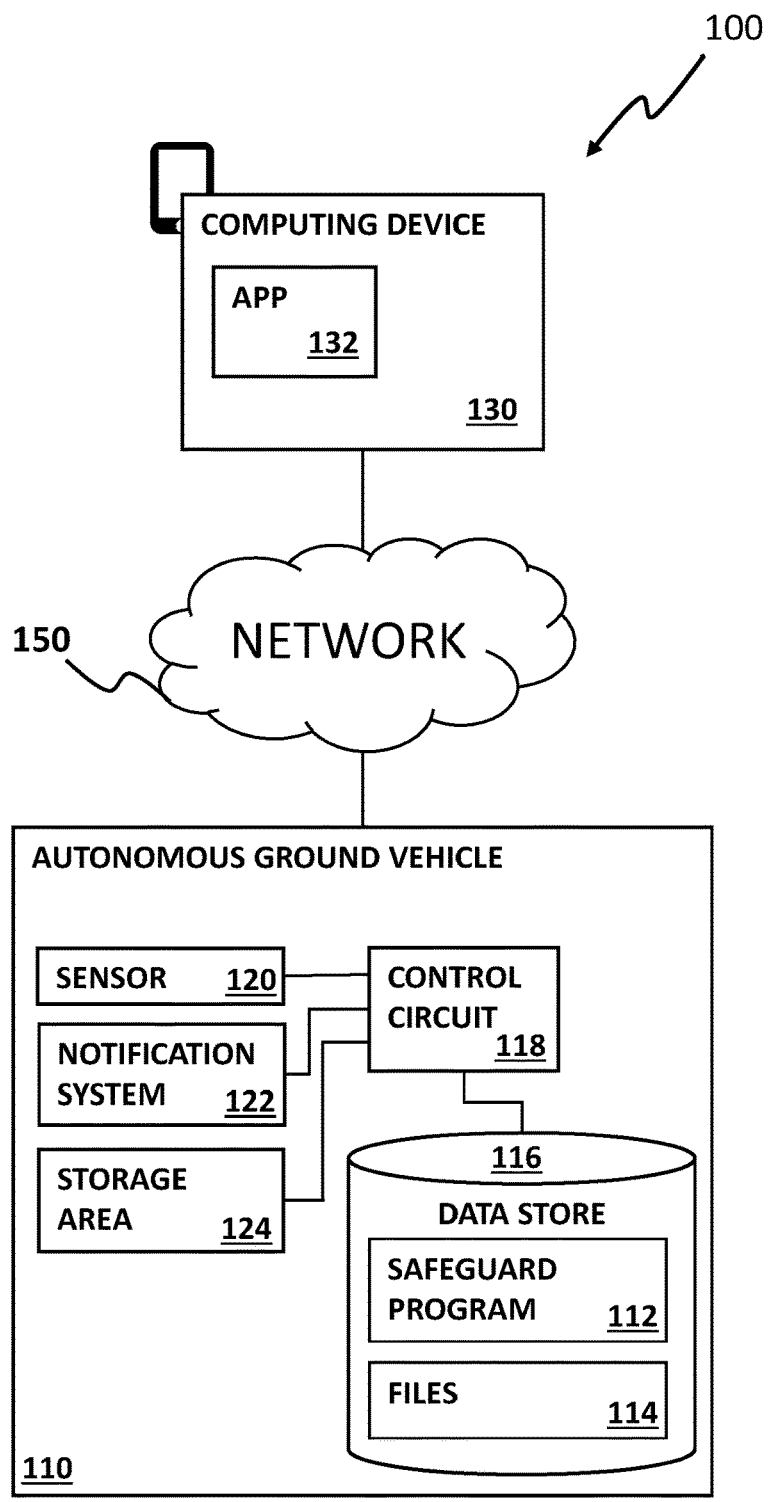
FIG. 1 illustrates a simplified block diagram of a system to enable delivery of commercial products to customers via an AGV, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment. The terms "a" and "an" are used interchangeably with the phrases "at least one" and "one or more".

Generally speaking, various systems and methods are provided herein useful to enable delivery of commercial products to customers via autonomous ground vehicles (AGVs). In some embodiments, a system includes AGVs on delivery routes to deliver commercial products to persons of interest ("PoIs"). Each AGV typically includes one or more control circuits and one or more sensors that transmit sensor data to the control circuits. Receiving the sensor data causes the control circuits to: determine whether a person positioned within a threshold distance relative to the AGV is a PoI; allow the PoI to designate the intention(s) of at least one second person positioned within the threshold distance as being friendly or adverse relative to the PoI; determine, using sensor data and independent of the intention designated by the PoI, the intention of the at least one second person positioned within the threshold distance as being friendly or adverse relative to the PoI; receive one or more commands from the PoI that override the determination that the intention of the at least one second person is adverse to the PoI; and allow the PoI to take possession of the commercial product when the designated intention(s) are friendly relative to the PoI and the command(s) are received.

Some embodiments provide methods for enabling the delivery of commercial products to customers, comprising: through the aid of an AGV on a product delivery route to deliver a commercial product(s) to a PoI, determining that a person positioned within a threshold distance relative to the AGV is the PoI; allowing the PoI to designate the intention of a second person(s) positioned within the threshold distance as being friendly or adverse relative to the PoI; determining, independent of the intention(s) designated by the PoI, the intention(s) of the second person(s) positioned within the threshold distance as being one of friendly or adverse relative to the PoI; receiving a command(s) from the PoI overriding the determination that the intention(s) of the second person(s) are adverse to the PoI; and allowing the PoI to take possession of the commercial product(s) when the designated intention(s) are friendly relative to the PoI and the command(s) are received.

FIG. 1 illustrates a simplified block diagram of a product delivery system 100 to enable delivery of commercial products to customers via AGVs, in accordance with some embodiments. The system, in some applications, includes one or more AGVs 110, and one or more computing devices 130 configured to communicate over a computer and/or one or more communication networks 150. Network 150 can be, for example, a local area network (LAN), a wide area network (WAN) such as the Internet, or a combination of the two, and includes wired connections, wireless connections, fiber optic connections, other such communication connections or combination of two or more of such communication connections. In general, network 150 can be any combination of connections and protocols that will support communications between computing device 130 and AVG 110, in accordance with some embodiments.

Computing device 130 is typically associated with a PoI. For example, PoIs may be persons that can be identified by the AGVs 110, prior delivery recipients, customers having purchase histories associated with the AGVs 110, and/or similar commercial relationships. Computing device 130 can be a desktop, laptop computer, a thin client, an in-vehicle computing device, a wearable computing device, a mobile device (including but not limited to, smart phones, phablets, and tablets), and other such devices. In general, computing device 130 can be any computing device capable of executing software application ("APP") 132 and communicate with AGV 110, in accordance with some embodiments.

Typically, the computing device 130 comprises I/O devices, including but not limited to, keyboards, buttons, displays, microphones, pointing devices, touch screen, audio outputs, and/or other such I/O devices that enable a PoI to interact with and/or obtain information from the computing device 130. The I/O devices may be part of or coupled with the computing device. Computing device 130 can comprise one or more navigation elements that provides geolocation data (such as latitude and longitude, GPS coordinates, Global Navigation Satellite Systems (GNSS) data, mapping information, address information, and/or other such location information) that reflects the present location of computing device 130. Further, computing device 130 can comprise one or more unique identifier codes that can be used to identify the computing device 130. In some instances, for example, computing device 130 can have a universally administered or locally administered media access control ("MAC") address, unique device identifier, and/or similar unique identifying code. Similarly, a unique serial number or other code may be defined within the APP 132 that uniquely identifies computing device 130.

The computing device 130, in some applications, is configured to communicate with the AGV 110. In part, APP 132 can cause transmission of a unique identifier code, a computing device identifier, phone number, password, and/or other identifier information associated with computing device 130 and/or a user to the AGV 110. Additionally or alternatively, the APP 132 may cause transmission of geolocation data that reflects the present location of computing device 130 to AGV 110. In some applications, for example, the APP 132 can cause transmission of non-publically available information about the PoI that is stored on and/or accessible via computing device 130 to AGV 110. For example, non-publically available information can comprise the PoI's browser history, social media postings, contacts list entries, social media metadata, and geographical identification metadata. App 132 can convey information, for example notifications, received from safeguard program 112 to users of computing device 130.

AGV 110 is a ground-based delivery vehicle that autonomously traverses one or more intended environments in accordance with one or more routes and/or determined paths, and typically without the intervention of a human, while delivering consumer products and/or to perform one or more tasks. In some instances, however, a remote operator may temporarily or permanently take over operation of the AGV 110 using feedback information from the AGV 110 (e.g., audio and/or video content, sensor information, etc.) communicated to a remote navigation center and/or central control system. AGV 110 can traverse environments to engage in delivering one or more commercial products, picking one or more commercial products up for return, retrieving one or more commercial products to subsequently be delivered to a location or customer, obtaining video content, obtaining one or more samples through the application of one or more sensors, conveying one or more advertisements, perform one or more other relevant tasks, or combination of two or more of the aforementioned tasks.

Further, AGV 110 includes one or more propulsion systems (e.g., motors, wheels, tank treads, etc.) that enable AGV 110 to at least accelerate, deaccelerate, and/or traverse an environment using a navigation coordinate system, such as GPS, coordinate mapping information, beacon location information, cellular signal triangulation, other navigation systems and/or information, or a combination of two or more of such navigation systems and/or information. Further, the navigation coordinate system can be configured to provides location information, and in some instances time information. In some embodiments, AGV 110 is configured to operate in different weather conditions, and/or can be readily modified depending on expected weather conditions (e.g., wheels replaced with tank treads when it is anticipated that AGV 110 may encounter snow and/or ice). AGV 110 can, in some applications, be further configured to communicate with other AGVs, autonomous vehicles, transport vehicles, multiple different types of computing devices, a remote central control system, other computing devices, remote databases, and/or other such devices. AGV 110 typically includes one or more wired and/or wireless transceivers enabling one or more different modes of communication (e.g., cellular, satellite, Wi-Fi, Ethernet, etc.).

AGV 110 can comprise one or more sensors 120, notification systems 122, storage areas 124, and data stores 116 each communicatively coupled to one or more copies of control circuits 118. In certain applications, sensor 120 and notification system 122 are implemented together through a single device. In some applications, storage area 124 is a storage compartment secured via one or more locking mechanisms positioned proximate to or communicatively coupled to one or more lock sensors that can discern the state of the locking mechanisms (e.g., locked and unlocked). Locking mechanisms may be controlled by the one or more control circuits 118, central control systems via network 150, and/or PoIs via APPs 132. Storage area 124 can be configured to store one or more commercial products (e.g., for delivery to one or more PoIs and/or vendors, return to one or more vendors, or a combination of the two). In some instances, the storage area may maintain a particular internal environmental condition (e.g., one or more temperatures, pressures, hermetic conditions, or a combination of two or more of the environmental conditions) through one or more environmental control systems of the AGV.

Notification system 122 can be configured to convey information, notifications, warnings and/or deterrents to a PoI, a worker, a potential threat (e.g., animal, person that is a potential threat), unknown third parties, a remote central control system, a security service, a municipal police service, other such entities, or combination of two or more of such entities. Notification system 122 can, in certain embodiments, be an output device that comprises one or more displays and/or light sources, emits audio and/or visual signals (for example, music, tones, text, images, video), or a combination of two or more of the aforementioned characteristics. Similarly, notification system 122 can additionally or alternatively be configured to facilitate wireless data communications with a computing device, including but not limited to, computing device 130 via one or more different modes of communication (e.g., cellular, satellite, Wi-Fi, Ethernet, etc.).

AGV 110 further typically includes multiple sensors 120. The sensors 120 can include substantially any relevant sensor device and/or system that provides information to AGV 110 to be used in navigation, PoI detection, potential threat detection, distances measurements (e.g., proximity sensors, time-of-flight sensors), environment mapping, location determination, and/or other such sensor information. In some embodiments, the sensor 120 includes one or more devices that can be used to capture data related to one or more objects located within a threshold distance relative to AGV 110.

For example, one or more sensors 120 can be included and/or cooperated with the AGV that include, but are not limited to, one or more sensors to detect an object within one or more threshold or predetermined distances of the AGV, capture data within a threshold distance relative to AGV 110, detect movement, capture images and/or video (e.g., thermographic, infrared, and/or multispectral images), capture biometric data, capture images of entities attempting to tamper with AGV 110, one or more accelerometers, one or more gyroscopes, one or more odometers, one or more location sensors, captures sound waves (e.g., which can be configured to capture audible authentication codes and/or voice prints, threatening language, verbal input from customers, verbal inquiries from customers, etc.), one or more distance measurement sensors (e.g., laser sensors, sonar sensors, sensors that measure distance by emitting and capturing a wireless signal (which can comprise light and/or sound) etc.), 3D scanning sensors (e.g., time-of-flight camera), other such sensors, or a combination of two or more of such sensors.

In some embodiments, one or more data stores 116 provide an information repository that typically stores safeguard program 112 and files 114. AGV 110 may, in some embodiments, further access one or more safeguard programs 112, files 114 and/or other relevant information external to AGV 110 and accessible via network 150. Files 114 can comprise, for example, information transmitted by APP 132, captured by sensors 120 (real-time and/or historic), PoI information, customer information, product information, predetermined biometric information, customer order information, navigation and/or routing information, location information, mapping information, AGV identifier information, communication procedures, information on criminal activity (e.g., for a particular city, town, region, street, house, similar information, or a combination of two or more of the foregoing descriptives), threat information, images, video, and/or other such information.

The predetermined biometric data can be supplied by PoIs, generated by control circuit 118 using information previously captured by sensor 120, can be used for authentication purposes, and/or determining the presence of unknown and/or hostile third parties. Applicable biometric data can include, but is not limited to voice prints, iris-patterns, retina-patterns, hand geometries, earlobe geometries, facial landmarks, thermographic signatures, vascular patterns, skin texture data points, and/or walking gate data points. For example, in some embodiments, files 114 can further comprise template notifications, which are generic audio and/or visual messages used by control circuits 118 to convey announcements to persons (e.g., PoIs, customers, pedestrians, law enforcement agents, central control systems, or similar individuals) that can be personalized by the use of a the person's first name, last name, likeness, image, physical characteristics, or a combination of two or more of the personalizing elements. Personalized notifications are typically conveyed to bring a PoI's attention to potential and/or actual hostile third parties, which are entities having an actual or potential ability to interfere with commercial exchanges between AGVs 110 and PoIs, or molest AGVs 110 and/or PoIs.

As described above, AGV 110 further includes one or more safeguard programs 112 that are stored in data store 116 and/or other memory, and utilized at least by the one or more control circuits 118. In some applications, one or more of the programs 112 are software that are executed by the one or more control circuits 118 to facilitate the operation, control, commercial activity, interaction with PoIs, reducing risk and the like of AGV 110. For example, the one or more control circuits 118 in executing one or more safeguard programs 112 can use data generated by one or more sensors 120 to detect when PoIs and third parties are positioned within a threshold distance relative to AGV 110, transmit notifications to the PoIs to ascertain the perceived intention of the third parties as being benign, unknown, or adverse to the PoI and/or AGV 110, as well as deny access to the storage area 124 when the PoI perceives the intention of the third party as hostile to AGV 110 and/or the PoI.

Hostile third parties can further refer to biological entities and/or autonomous vehicles attempting to interfere with the operation of AGV 110, which may, for example, be characterized as any attempts to gain unauthorized access to an internal area of the AGV 110, attempts to gain unauthorized access to the AGV 110 software and/or hardware, attempts to gain unauthorized access to products being transported by the AGV 110, attempt to damage the AGV 110, attempts to obstruct the travel path of AGV 110, and/or other activities that may be detrimental to the AGV 110, and/or interfere with the AGV 110. Even more, hostile third parties can further refer to biological entities and/or autonomous vehicles that are positioned within a threshold distance relative to PoIs and/or AGV 110, possess a means to inflict harm on PoIs, attempt to take unauthorized possession of one or more commercial products stored in storage area 124, or a similar act.

Additionally or alternatively, control circuit 118, in executing one or more programs 112, can generate one or more types of biometric data (discussed above) using information captured via sensor 120, and determine whether the generated biometric data has one or more threshold relationships to predetermined biometric data included in files 114, wherein generated biometric data having the one or more threshold relationships identify PoIs and such data lacking such threshold relationships identify unknown and/or hostile third parties. In the same vein, one or more control circuits 118, in executing one or more safeguard programs 112, can receive, generate, and/or capture authentication data, and determine whether the received, generated, and/or captured authentication data has one or more threshold relationships to predetermined authentication data included in files 114, wherein received, generated, and/or captured data having the one or more threshold relationships identify PoI and such data lacking the one or more threshold relationships identify unknown third parties (i.e., unidentifiable persons present within the threshold distance in addition to the PoI). For example, control circuits 118, in executing one or more safeguard programs 112, can compare the received, generated, and/or captured authentication data to the predetermined authentication data included in files 114 to determine whether one or more threshold relationships exists. Received authentication data, for example, can include predetermined data received from computing device 130 and/or central control systems (e.g., the unique identification codes discussed above) and generated authentication data can include biometric data generated by control circuit 118 using data captured by sensors 120.

In certain embodiments, one or more control circuits 118, in executing one or more safeguard programs 112 can determine whether unknown third parties are hostile by, for example, processing one or more images of the unknown third parties captured by sensors 120 to determine whether the unknown third party is displaying any objects having one or more threshold relationships to a weapon (e.g., knife, gun, metallic object, baseball bat, golf club, and similar weapons).

Figure 2:
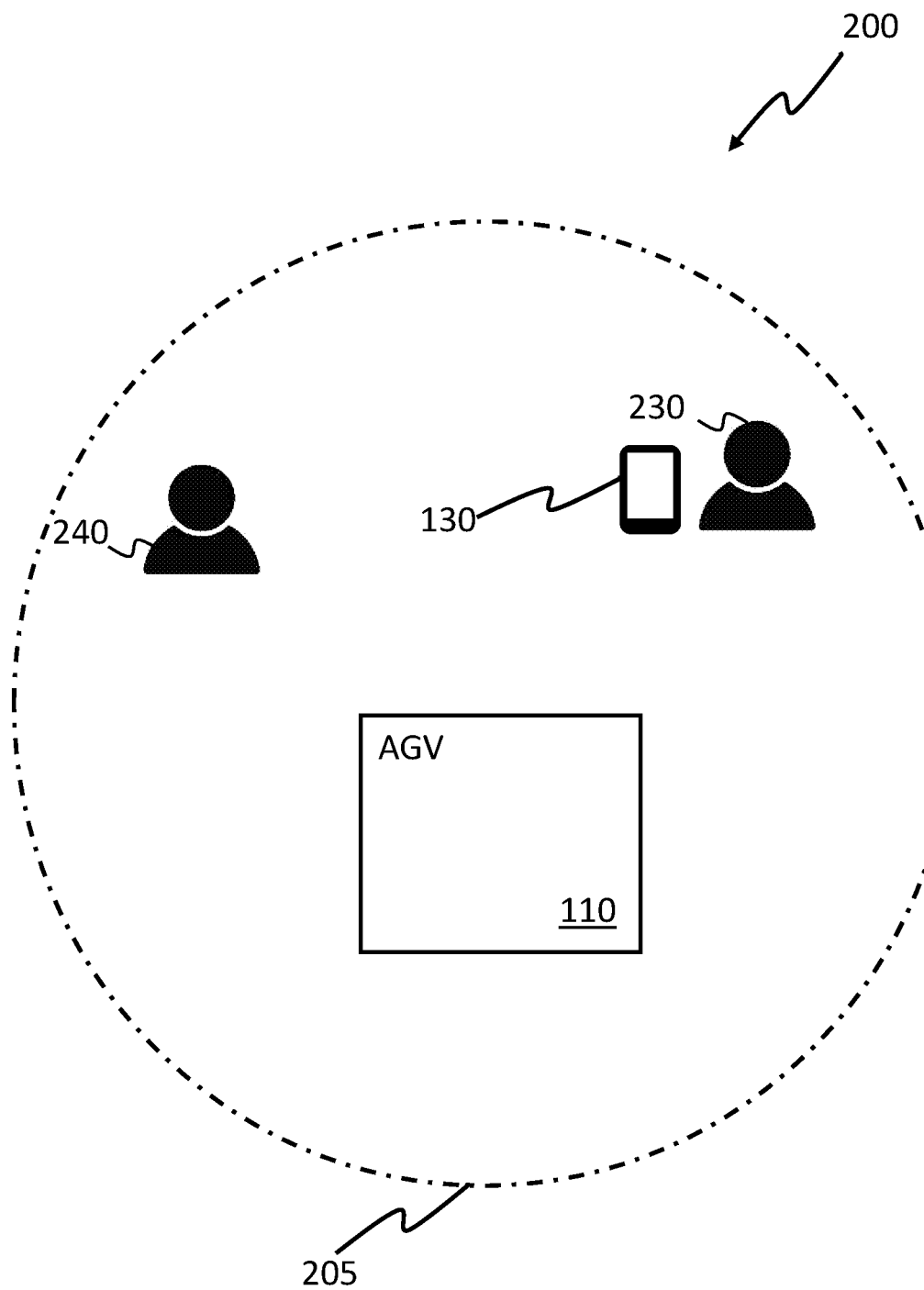
FIG. 2 depicts an exemplary environment for enabling delivery of commercial products to customers via an AGV, in accordance with several embodiments.
Figure 3:
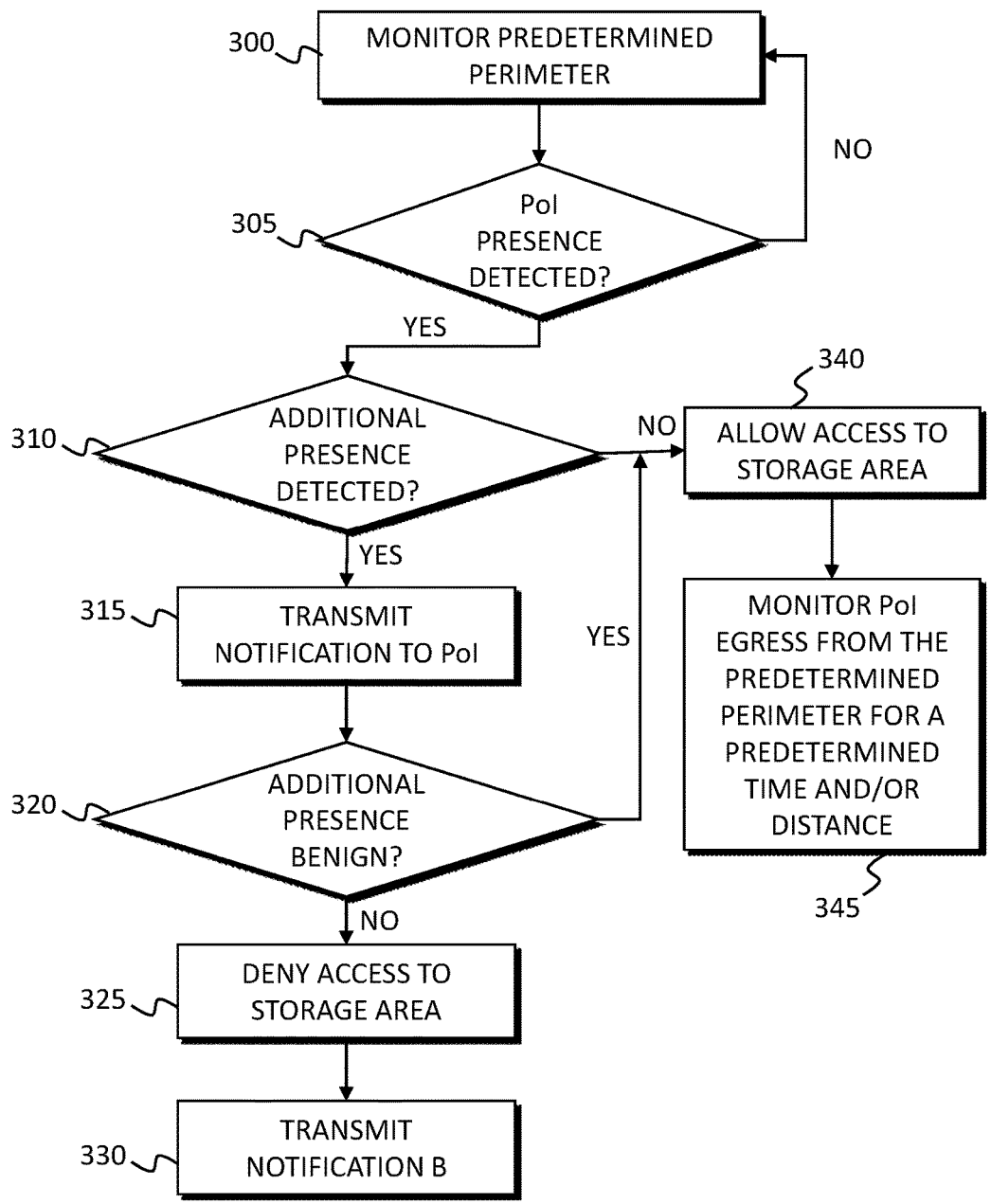
FIG. 3 is a flowchart of an exemplary process for enabling delivery of commercial products to customers via an AGV, in accordance with some embodiments.

FIGS. 2-3 are utilized herein to facilitate a description of one or more safeguard programs 112. FIG. 2 depicts an exemplary environment for enabling delivery of commercial products to customers, in accordance with several embodiments. AGV 110 is configured to engage in delivering one or more commercial products, picking up one or more commercial products up for return, retrieving one or more commercial products to subsequently be delivered to a location or customer, obtaining video content, obtaining one or samples through the application of one or more sensors, performing one or more commercial activities, perform one or more other relevant tasks, or combination of two or more tasks. Perimeter 205, for example, is the threshold distance within which AGV 110 is programmed to assist PoIs in maintaining situational awareness during commercial exchanges with AGV 110.

As discussed above, the safety and/or normal operation of the AGV 110 typically necessitates the need for the AGV 110 to have situational awareness of its immediate environment. For example, AGV 110 arrives at the predetermined delivery location as determined by, for example, delivery data received from a central control system or information included in files 114. Upon arrival, control circuits 118, invoking one or more safeguard programs 112, processes data captured by sensors 120 of one or more objects positioned within perimeter 205, which, for example, may reflect a radius at which AGV 110 can identify unknown third-parties, notify the PoI of the unknown third-party's presence, and take evasive action when the perceived intention of the unknown third-party is designated by the PoI as adverse to AGV 110 and/or the PoI. PoI 230, depicted as a person in possession of a copy of computing device 130, approaches AGV 110 to engage in one or more commercial activities with AGV 110 (e.g., take possession of one or more commercial products stored in storage area 124).

For example, in response to PoI 230 entering perimeter 205, one or more control circuits 118, invoking one or more safeguard programs 112, can determine the presence of PoI 230 within perimeter 205 using one or more authenticating methods, as described above.

Subsequently, pedestrian 240 enters perimeter 205. Although pedestrian 240 is depicted as a person that does not possess a copy of computing device 130, in certain embodiments, pedestrian 240 may be in possession of a computing device that does not have a copy of APP 132 stored thereon, which, therefore, restricts that particular computing device to transmitting one or more unique identifier codes (described above) that can be used by control circuits 118 to determine the identity of pedestrian 240, as described above. For example, control circuits 118, invoking one or more safeguard programs 112, can determine that pedestrian 240 is positioned in perimeter using one or more of the authenticating methods discussed above. In certain embodiments, in response to detecting the presence of PoI 230 positioned within perimeter 205, control circuits 118, invoking safeguard programs 112, can determine the presence of unknown third-parties positioned within a second perimeter (i.e. a second threshold distance) having a radius that is greater than the radius of perimeter 205 and thereby increase the distance at which the presence of unknown third-parties may be detected. The increased distance can increase the safety of PoI 230 and/or AGV 110 by increasing the overall reaction time allotted to PoI 230 and/or AGV 110 when the presence of unknown parties are determined.

In response to detecting pedestrian 240, control circuits 118, invoking one or more safeguard programs 112, transmits one or more notifications to the PoI's computing device 130 for conveyance by APP 132 to PoI 230, which allow PoI 230 to designate the perceived intention of pedestrian 240. Alternatively or additionally, control circuits 118, invoking one or more safeguard programs 112, may convey one or more notifications via notification system 122, which can include one or more images of pedestrian 240, audibly alert PoI 230 to the presence of pedestrian 240, allow PoI 230 to designate the perceived intention of pedestrian 240 as being benign or adverse relative to self and/or AGV 110.

As described above, notifications can be personalized using data associated with PoI 230, pedestrian 240, or a combination of the two. For example, notifications may comprise a PoI's name, customer code, address, likeness or image, one or more images of pedestrian 240, or a combination of two or more personalizing data points. Notifications can further comprise binary questions (e.g., yes or no) to reduce the time required to designate intention and facilitate a psychological beneficial interaction between PoIs and AGVs 110, which may reduce psychological strain during a perceived crisis event. In certain embodiments, notifications may comprise an override mechanism that allows the PoI to change the designated/confirmed intention of the unknown third-party from adverse to benign and vice-versa. Such override mechanisms may be provided in notifications for an unlimited or a predetermined amount of time and can allow PoIs to change their initial assessment of the unknown third-party's intention and thereby facilitate a psychologically beneficial interaction between the PoI and the AGV 110. PoI 230 can use APP 132, notification system 122, or a combination of the two choices to respond to notifications and designate the intention of pedestrian 240. For example, control circuits 118, invoking one or more safeguard programs 112, can process verbal responses received via notification system 122 or APP 132 by converting one or more segments of the received response into machine readable code and determining whether the machine readable code has a threshold relationship to predetermined words and phrases that may reflect a benign or adverse intention.

The predetermined words and phrases can comprise "help!", "threat detected", "I feel threatened", "all good", "ok", "I'm ok", "all clear", "yes", "no", similar words and phrases that may reflect the intention of pedestrians, or a combination of two or more of the aforementioned words and phrases. In some embodiments, notifications can comprise interactive visual displays presented to PoI 230 via APP 132 that comprise one or more visual indicators, graphical icons, or a combination of the two. For example, control circuits 118, invoking one or more safeguard programs 112, can generate a notification that comprises an image of pedestrian 240 and graphical icons that designate a benign and adverse intent, and transmit the notification to APP 132 for display and thereby allow PoI 230 to interact with the visual display of the transmitted notification to designate the intention of pedestrian 240.

For example, if control circuits 118, invoking one or more safeguard programs 112, determine that the received response designates the intention as benign, then control circuits 118 can instruct storage area 124 to disengage its one or more locking mechanisms, which allows PoI 230 to access storage area 124 and take possession of the commercial products included in storage area 124. In instances wherein storage area 124 comprises multiple sub-areas, control circuits 118, invoking one or more safeguard programs 112, can instruct storage area 124 to disengage the locking mechanisms for the particular sub-areas associated with PoI 230. In certain embodiments, if the control circuits 118, invoking one or more safeguard programs 112, determine that the received response designates the intention as adverse, safeguard program 112 typically does not instruct storage area 124 to disengage its one or more locking mechanism and may instead generate a notification of the adverse event and subsequently transmit, via notification system 122, the generated notification to law enforcement agencies, law enforcement agents, a central control system, an electronic community bulletin board, interested third parties, and any combination of two or more of the aforementioned interested third parties.

Control circuits 118, invoking one or more safeguard programs 112, can generate notifications of adverse events that may comprise one or more types of biometric data (discussed above) that characterize pedestrian 240 captured by sensor 120. In some instances, the AGV may generate notifications of adverse events that include audible and/or visual warnings that would be heard and/or visible by the potential threatening pedestrian 240 in attempts to get the potential threatening pedestrian to go away or at least out of the perimeter 205. In yet other instances, the PoI can transmit or convey one or more commands to the AGV to override their initial designation of the intention of the other person positioned within the threshold distance. For example, control circuits 118, invoking safeguard programs 112, can include one or more graphical icons in generated notifications that the PoI can select to transmit a command to the AGV 110 that overrides (i.e., change) their prior designation of the intention of the other person positioned within the threshold distance. Additionally or alternatively, control circuits 118, invoking safeguard programs 112, can generate notifications that allow the PoI to verbally override their initial designation of the intention of other persons positioned within the threshold distance by verbally conveying one or more predetermined words or phrases that can reflect benign or adverse intentions (discussed above).

FIG. 3 is a flowchart of an exemplary process for enabling delivery of commercial products to customers via AGV, in accordance with a plurality of embodiments. Safeguard program 112 monitors the predetermined perimeter relative to AGV 110 (step 300). If safeguard program 112 fails to detect the presence of a PoI within the predetermined perimeter ("no" branch decisional 305), then safeguard program 112 returns to step 300. If safeguard program 112 detects the presence of a PoI within the predetermined perimeter ("yes" branch decisional 305), then safeguard program 112 determines whether an additional presence is detected within the predetermined perimeter (decisional 310).

If safeguard program 112 does not detect the presence of an additional person within the predetermined perimeter ("no" branch decisional 310), then safeguard program 112 allows the PoI to access storage area 124 (step 340) and proceeds to step 345. If an additional presence is not detected, it is assumed that the PoI is not in any immediate danger. Safeguard program 112 monitors the egress of the PoI from the predetermined perimeter for a predetermined time and/or distance relative to AGV 110 (step 345). For example, subsequent to the PoI accessing storage area 124 to, for example, take possession of the commercial items, control circuits 118, invoking one or more safeguard programs 112, instructs sensor 120 to capture images of objects (e.g., the PoI and/or the second persons) positioned within the predetermined perimeter until control circuits 118 no longer detects the presence of the PoI in the captured images. If safeguard program 112 detects an additional presence within the predetermined perimeter ("yes" branch decisional 310), then safeguard program 112 transmits a notification to the PoI (step 315) and proceeds to decisional 320.

Here, the transmitted notification alerts the PoI to the additional presence and directs the PoI to designate the intent of the additional presence as discussed above. If safeguard program 112 determines that the intent is designated as benign ("yes" branch decisional 320), then safeguard program 112 proceeds to step 340. In certain embodiments, the safeguard program 112 can determine, using data from the sensors 120 and independent of the designated intention, the intention(s) of the second person(s) relative to the PoI. The safeguard program 112 can receive a command(s) from the PoI overriding the determination(s) that the intention(s) of the second persons(s) are adverse to the PoI. In some embodiments, the safeguard program 112 can allow the PoI to take possession of the commercial product(s) when the designated intention(s) of the second person(s) are friendly relative to the PoI and the command(s) from the PoI are received. If safeguard program 112 determines that the designated intent is not benign (i.e. adverse) ("no" branch decisional 320), then safeguard program 112 denies access to storage area 124 (step 325) and proceeds to step 330. Safeguard program 112 transmits notification B (step 330). For example, notification B can comprise information that reflects the adverse event as discussed above. Additionally, or alternatively, subsequent to step 340, control circuits 118, invoking one or more safeguard programs 112, can instruct sensor 120 to capture data of the PoI and/or the additional presence (i.e., the second person) until thier presence is no longer detected within the predetermined perimeter (step 345). In some embodiments, safeguard program 112 can monitor PoI egress from the predetermined perimeter for a predetermined time and/or within another predetermined perimeter (e.g., which can be longer than the initial predetermined perimeter). It is noted that the process of FIG. 3 may be performed by one or more of the components of embodiments of the system of FIG. 1, and/or other suitable systems.

Figure 4:
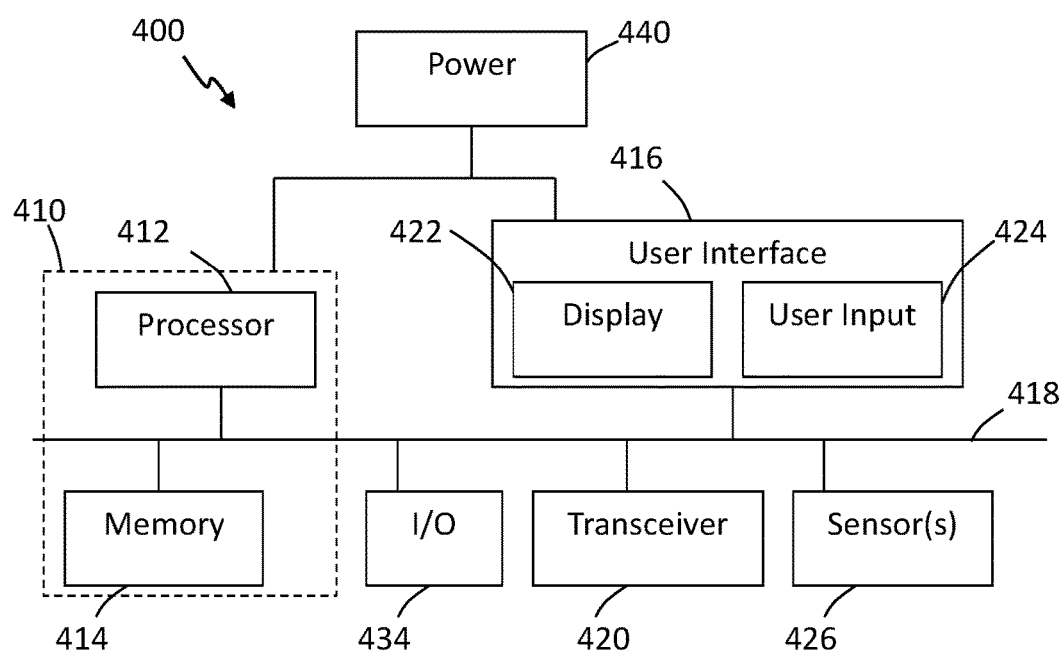
FIG. 4 is a block diagram of a system that may be implemented in one or more of the devices described herein in accordance with some embodiments.

Further, the circuits, circuitry, systems, devices, processes, methods, techniques, functionality, services, servers, sources and the like described herein may be utilized, implemented and/or run on many different types of devices and/or systems. FIG. 4 illustrates an exemplary system 400 that may be used for implementing any of the components, circuits, circuitry, systems, functionality, apparatuses, processes, or devices of the AGV 110, the control circuit 118 of the AGV 110, the computing device 130, and/or other above or below mentioned systems or devices, or parts of such circuits, circuitry, functionality, systems, apparatuses, processes, or devices. For example, the system 400 may be used to implement some or all of the AGV 110, the control circuit 118, one or more other control circuits and/or processing systems of the AGV 110 (e.g., video processing systems, image processing systems, sensor data processing systems, emitter system, and the like), one or more control and/or processing systems of the computing device 130, one or more remote central control/computing systems, and/or other such components, circuitry, functionality and/or devices. However, the use of the system 400 or any portion thereof is certainly not required.

By way of example, the system 400 may comprise a control circuit or processor module 412, memory 414, and one or more communication links, paths, buses or the like 418. Some embodiments may include one or more user interfaces 416, and/or one or more internal and/or external power sources or supplies 440. The control circuit 412 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 412 can be part of control circuitry and/or a control system 410, which may be implemented through one or more processors with access to one or more memory 414 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 400 may be used to implement one or more of the above or below, or parts of, components, circuits, systems, processes and the like.

The user interface 416 can allow a user to interact with the system 400 and receive information through the system. In some instances, the user interface 416 includes a display 422 and/or one or more user inputs 424, such as buttons, touch screen, track ball, keyboard, mouse, etc., which can be part of or wired or wirelessly coupled with the system 400. Typically, the system 400 further includes one or more communication interfaces, ports, transceivers 420 and the like allowing the system 400 to communicate over a communication bus, a distributed computer and/or communication network 150 (e.g., a local area network (LAN), the Internet, wide area network (WAN), etc.), communication link 418, other networks or communication channels with other devices and/or other such communications or combination of two or more of such communication methods. Further the transceiver 420 can be configured for wired, wireless, optical, fiber optical cable, satellite, or other such communication configurations or combinations of two or more of such communications. Some embodiments include one or more input/output (I/O) ports 434 that allow one or more devices to couple with the system 400. The I/O ports can be substantially any relevant port or combinations of ports, such as but not limited to USB, Ethernet, or other such ports. The I/O interface 434 can be configured to allow wired and/or wireless communication coupling to external components. For example, the I/O interface 434 can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 426 to provide information to the system and/or sensor information that is communicated to another component, such as the central control system, a delivery vehicle, etc. The sensors can include substantially any relevant sensor, such as distance measurement sensors (e.g., optical units, sound/ultrasound units, etc.), cameras, motion sensors, inertial sensors, accelerometers, impact sensors, pressure sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 400 comprises an example of a control and/or processor-based system with the control circuit 412. Again, the control circuit 412 can be implemented through one or more processors, controllers, central processing units, logic, software and the like. Further, in some implementations the control circuit 412 may provide multiprocessor functionality.

The memory 414, which can be accessed by the control circuit 412, typically includes one or more processor readable and/or computer readable media accessed by at least the control circuit 412, and can include volatile and/or nonvolatile media, such as RAM, ROM, EEPROM, flash memory and/or other memory technology. Further, the memory 414 is shown as internal to the control system 410; however, the memory 414 can be internal, external or a combination of internal and external memory. Similarly, some or all of the memory 414 can be internal, external or a combination of internal and external memory of the control circuit 412. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 150. The memory 414 can store code, software, executables, scripts, data, content, lists, programming, programs, log or history data, user information, PoI information, customer information, product information, and the like. While FIG. 4 illustrates the various components being coupled together via a bus, it is understood that the various components may actually be coupled to the control circuit and/or one or more other components directly.

In some embodiments, systems and a corresponding method performed by the systems that enable delivery of commercial products to customers, comprises: an autonomous ground vehicle ("AGV") on a delivery route to deliver one or more commercial products to one or more persons of interest ("PoIs"). The AGV comprises one or more control circuits and sensors that transmit sensor data to the control circuits. Receiving the sensor data causes the control circuits to: determine whether a person positioned within a threshold distance relative to the AGV is a PoI; allow the PoI to designate the intention(s) of at least one second person positioned within the threshold distance as being friendly or adverse relative to the PoI; determine, using sensor data and independent of the intention designated by the PoI, the intention of the at least one second person positioned within the threshold distance as being friendly or adverse relative to the PoI; receive one or more commands from the PoI that override the determination that the intention of the at least one second person is adverse to the PoI; and allow the PoI to take possession of the commercial product when the designated intention(s) are friendly relative to the PoI and the command(s) are received.

Some embodiments provide methods for enabling the delivery of commercial products to customers, comprising: through the aid of an AGV on a product delivery route to deliver a commercial product(s) to a PoI, determining that a person positioned within a threshold distance relative to the AGV is the PoI; allowing the PoI to designate the intention of a second person(s) positioned within the threshold distance as being friendly or adverse relative to the PoI; determining, independent of the intention(s) designated by the PoI, the intention(s) of the second person(s) positioned within the threshold distance as being one of friendly or adverse relative to the PoI; receiving a command(s) from the PoI overriding the determination that the intention(s) of the second person(s) are adverse to the PoI; and allowing the PoI to take possession of the commercial product(s) when the designated intention(s) are friendly relative to the PoI and the command(s) are received.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An autonomous product delivery system to enable delivery of commercial products to customers comprising:
   an autonomous ground vehicle ("AGV") on a commercial delivery route to deliver a commercial product to a person of interest ("PoI"), the AGV comprising:
   a control circuit; and
   a sensor communicatively coupled with the control circuit and configured to communicate sensor data to the control circuit;
   wherein the control circuit, based on the sensor data, is configured to:
   determine that a person positioned within a threshold distance relative to the AGV is the PoI;
   allow the PoI to designate an intention of a second person positioned within the threshold distance as being one of friendly or adverse relative to the PoI;
   receive, from the PoI, an indication of the intention of the second person positioned within the threshold distance; and
   if the indication of the intention of the second person positioned within the threshold distance is friendly, allow the PoI to take possession of the commercial product.

2. The autonomous product delivery system of claim 1, wherein the control circuit is further configured to:
   if the indication of the intention of the second person positioned within the threshold distance is adverse, not disengage one or more locking mechanisms of a storage area of the AGV.

3. The autonomous product delivery system of claim 2, wherein the control circuit is further configured to:
   transmit an alert indicating that the intention of the second person positioned within the threshold distance is adverse.

4. The autonomous product delivery system of claim 3, wherein the alert is transmitted to one or more of a mobile device associated with the PoI, a central control system, and a law enforcement agent.

5. The autonomous product delivery system of claim 2, wherein the AGV further comprises an audible emitter communicatively coupled with the control circuit, wherein the control circuit is further configured to cause the audible emitter to emit an audible alert.

6. The autonomous product delivery system of claim 2, wherein the control circuit is further configured to:
   store sensor data associated with the second person while the second person is positioned within the threshold distance.

7. The autonomous product delivery system of claim 1, wherein the control circuit in determining that the person positioned within the threshold distance relative to the AGV is the PoI is further configured to:
   compare a MAC address received from the person to a predetermined MAC address associated with the PoI; and
   determine that the person is the PoI when the MAC address received from the person has a threshold relationship with the predetermined MAC address associated with the PoI.

8. The autonomous product delivery system of claim 1, wherein the sensor is one or more of a camera, a thermographic camera, a time-of-flight camera, a biometric sensor, and a proximity sensor; and the control circuit, based on the sensor data, is further configured to:
   compare the sensor data to a predetermined data associated with the PoI; and
   determine that the person is the PoI when the sensor data has a threshold relationship with the predetermined data associated with the PoI.

9. The autonomous product delivery system of claim 1, wherein in response to the PoI taking possession of the commercial product, the control circuit, based on the sensor data, is further configured to store sensor data associated with one or more of the PoI and the second person while the PoI is positioned within a second threshold distance relative to the AGV.

10. The autonomous product delivery system of claim 1, wherein in determining that the person positioned with the threshold distance relative to the AGV is the PoI, the control circuit is further configured to:
    compare the sensor data to predetermined data associated with the PoI, wherein the sensor data comprises one or more of biometric data and an authentication code.

11. A method of enabling delivery of commercial products to customers comprising:
    determining, through an AGV on a product delivery route to deliver a commercial product to a PoI, that a person positioned within a threshold distance relative to the AGV is the PoI;
    allowing, through the AGV, the PoI to designate an intention of a second person positioned within the threshold distance as one of friendly or adverse relative to the PoI;
    receiving, at the AGV from the PoI, an indication of the intention of the second person positioned within the threshold distance; and
    if the indication of the intention of the second person positioned with the threshold distance is friendly, allowing, at the AGV, the PoI to take possession of the commercial product.

12. The method of claim 11, further comprising:
if the indication of the intention of the second person positioned within the threshold distance is adverse,
not disengaging one or more locking mechanisms of a storage area of the AGV.

13. The method of claim 12, further comprising:
transmitting an alert indicating that the intention of the second person positioned within the threshold distance is adverse.

14. The method of claim 13, wherein the alert is transmitted to one or more of a mobile device associated with the PoI, a central control system, and a law enforcement agent.

15. The method of claim 12, wherein the AGV includes an audible emitter and further comprising:
emitting, via the audible emitter, an audible alert.

16. The method of claim 12, further comprising:
storing sensor data associated with the second person while the second person is positioned within the threshold distance.

17. The method of claim 11, wherein the determining that the person positioned within the threshold distance relative to the AGV is the PoI comprises:
comparing a MAC address received from the person to a predetermined MAC address associated with the PoI; and
determining that the person is the PoI when the MAC address received from the person has a threshold relationship with the predetermined MAC address associated with the PoI.

18. The method of claim 11, wherein the sensor is one or more of a camera, a thermographic camera, a time-of-flight camera, a biometric sensor, and a proximity sensor; and the control circuit, based on the sensor data, and further comprising:
comparing the sensor data to a predetermined data associated with the PoI; and
determining that the person is the PoI when the sensor data has a threshold relationship with the predetermined data associated with the PoI.

19. The method of claim 11, further comprising:
in response to the PoI taking possession of the commercial product, storing sensor that the person is the PoI when the sensor data has a threshold relationship with the predetermined data associated with the PoI.

20. The method of claim 11, wherein the determining that the person positioned within the threshold distance relative to the AGV is the PoI comprises:
comparing the sensor data to predetermined data associated with the PoI, wherein the sensor data comprises one or more of biometric data and an authentication code.

* * * * *